Figure 3:
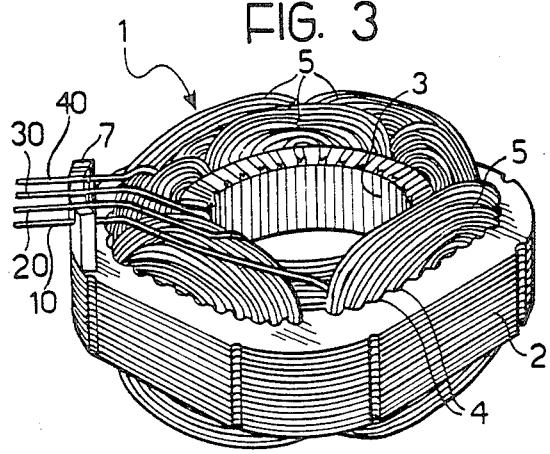

United States Patent [19]

Barrera

[11] Patent Number: 4,694,560

[45] Date of Patent: Sep. 22, 1987

[54] APPARATUS FOR TREATING STATOR WINDING LEADS

[75] Inventor: Giorgio Barrera, Leumann, Italy

[73] Assignee: Officine Meccaniche Pavesi & C. S.p.A., Turin, Italy

[21] Appl. No.: 863,216

[22] Filed: May 14, 1986

[30] Foreign Application Priority Data

Jul. 23, 1985 [IT] Italy .............................. 67674 A/85

[51] Int. Cl.⁴ ............................................. H02K 15/00
[52] U.S. Cl. ................................... 29/564.1; 29/596; 29/732; 29/736; 29/759
[58] Field of Search ................ 29/596, 732, 736, 753, 29/759, 564.1

[56] References Cited

U.S. PATENT DOCUMENTS 4,215,464 8/1980 Miller ................................ 29/732 X Primary Examiner—Carl E. Hall
Attorney, Agent, or Firm—Pennie & Edmonds

[57] ABSTRACT

A device usable in the manufacture of stators for dynamo-electric machines for fixing end portions of the coils of a stator to a support member carried by the stator comprises means for disposing the end portions of the stator coils in directions parallel to a plane substantially perpendicular to the axis of a stator and facing an end surface of the stator so as to make the end portions project outwardly from the stator, means for moving the end portions in the plane substantially perpendicular to the axis of the stator until they are brought into a zone of the end surface of the stator in which the support member is disposed, and means for thrusting the end portions downwardly to fit them into corresponding grooves provided in the support member.

9 Claims, 8 Drawing Figures

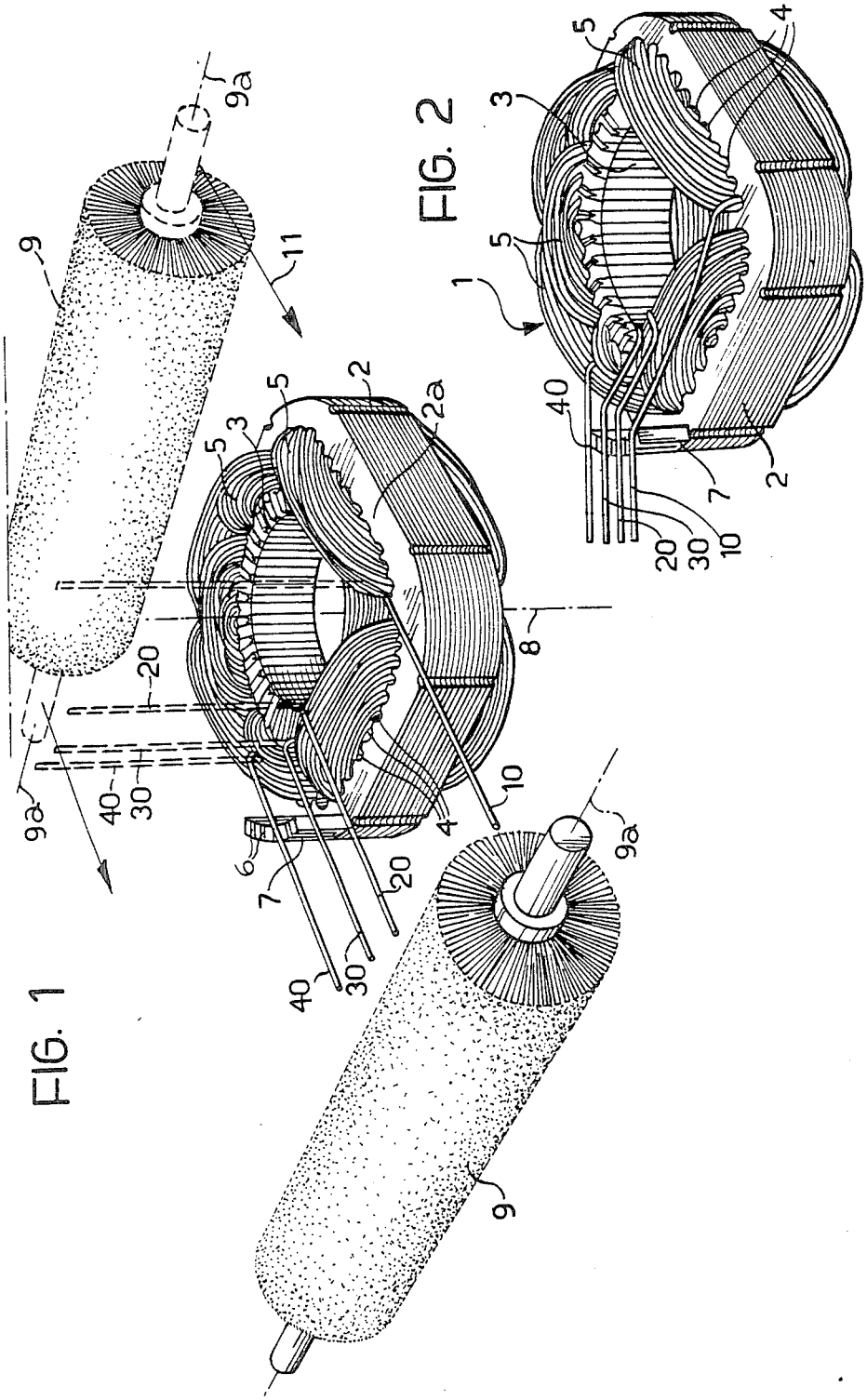

APPARATUS FOR TREATING STATOR WINDING LEADS

DESCRIPTION

The present invention relates to a device usable in the manufacture of stators of dynamo-electric machines for fixing end portions of the coils of a stator to a support member carried by the stator.

The main characteristic of the device according to the invention lies in the fact that it includes means for disposing the end portions of the coils of a stator along parallel directions lying in a plane substantially perpendicular to the axis of the stator and facing an end surface of the stator so as to make the end portions project outwardly from the stator, means for moving the end portions in the plane substantially perpendicular to the axis of the stator until they are brought in front of a zone of the end surface of the stator in which the support member is disposed, and means for thrusting the end portions downwardly to fit them into corresponding grooves provided in the support member.

The means for disposing the end portions of the coils along parallel directions lying in a plane perpendicular to the axis of the stator may be constituted, for example, by a rotary cylindrical brush having its axis perpendicular to the axis of the stator and driven so as to advance in a direction perpendicular both to the axis of the brush and to the axis of the stator.

In a preferred embodiment, the means for moving the end portions so as to bring them into the zone in which the support member is disposed comprise a series of engagement members movable in a circumferential direction outside the stator between a first position in which each of them is located next to and on one side of a respective end portion, and a second position in which they are located close together in correspondence with the support member, whereby the engagement members are arranged to thrust and group the end portions above the support member as a result of their movement from the first to the second positions.

In the preferred embodiment, the means for thrusting the end portions downwardly to fit them into the grooves of the support member comprise a series of movable blades guided in their movement between the engagement members when the latter are in their second positions. Preferably, each engagement member has a forked body with a radially outer arm and a radially inner arm arranged to engage the two sides of the support member.

According to a further characteristic of the preferred embodiment, the engagement members are carried by respective plates which are rotatable about the axis of the stator and means are provided for rotating the first of the plates, the remaining plates being driven as a result through a system of slots and pins.

Figure 5:
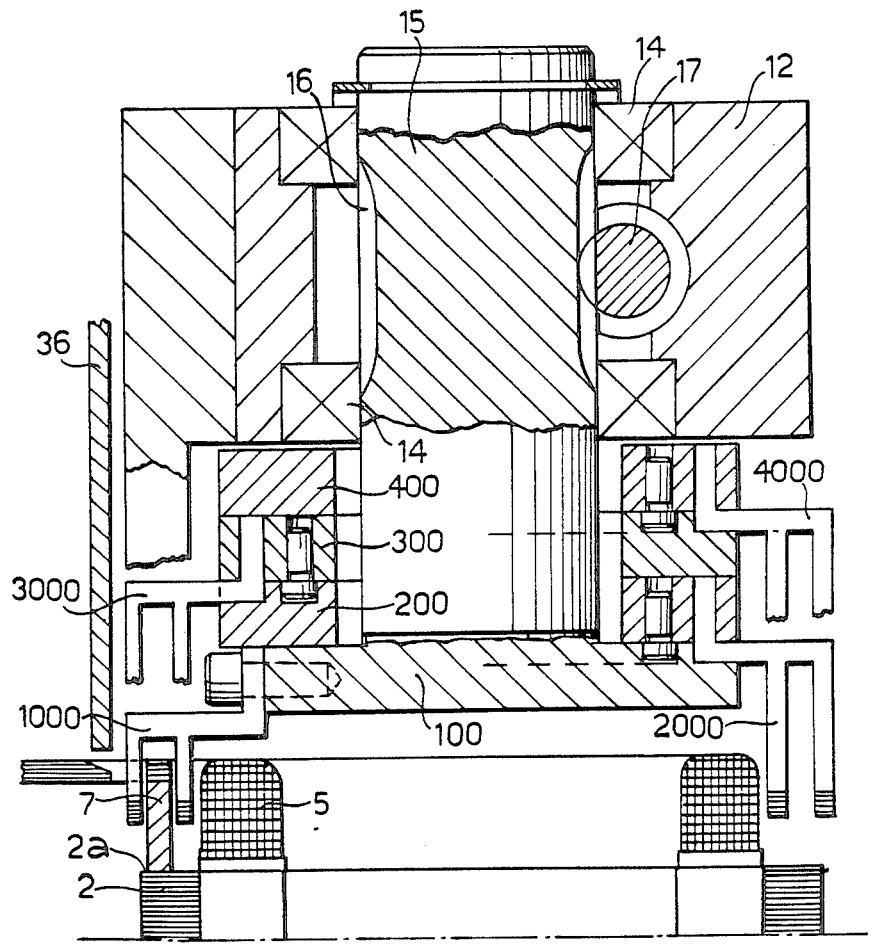
Figure 4:
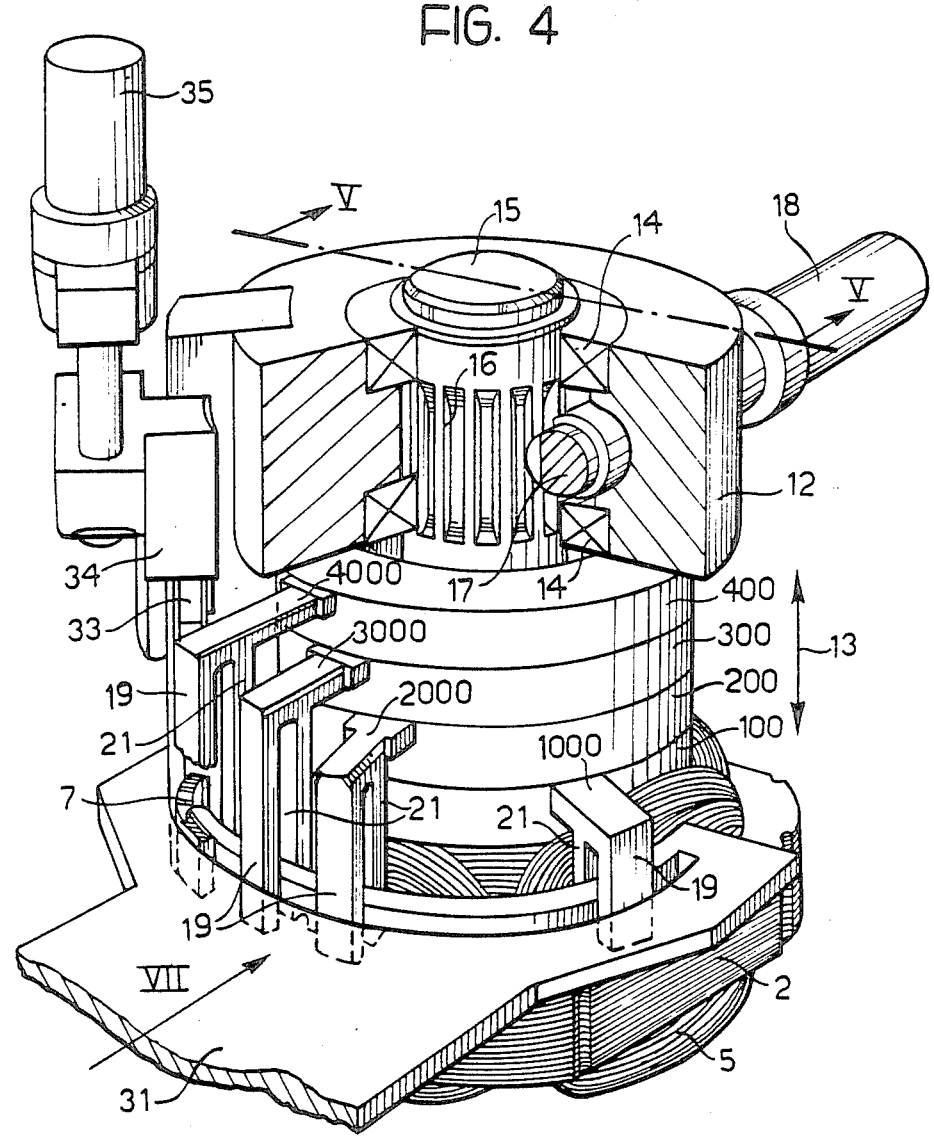
Figure 6:
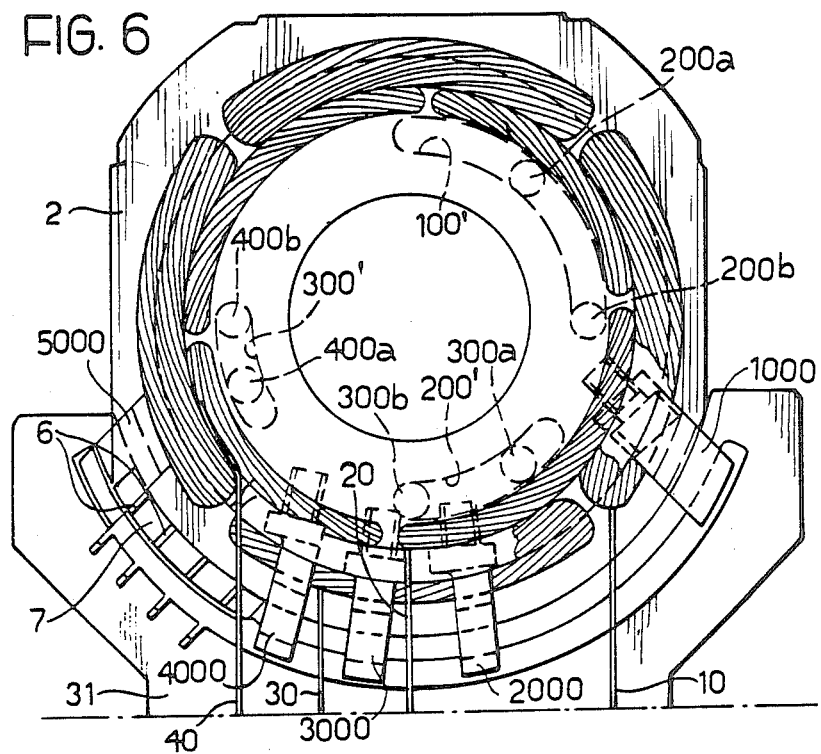
Figure 7:
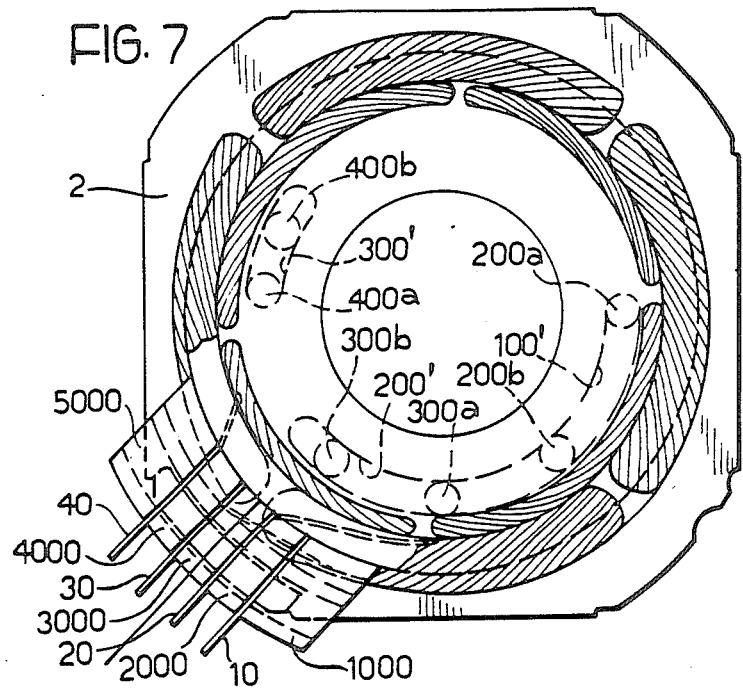
Figure 8:
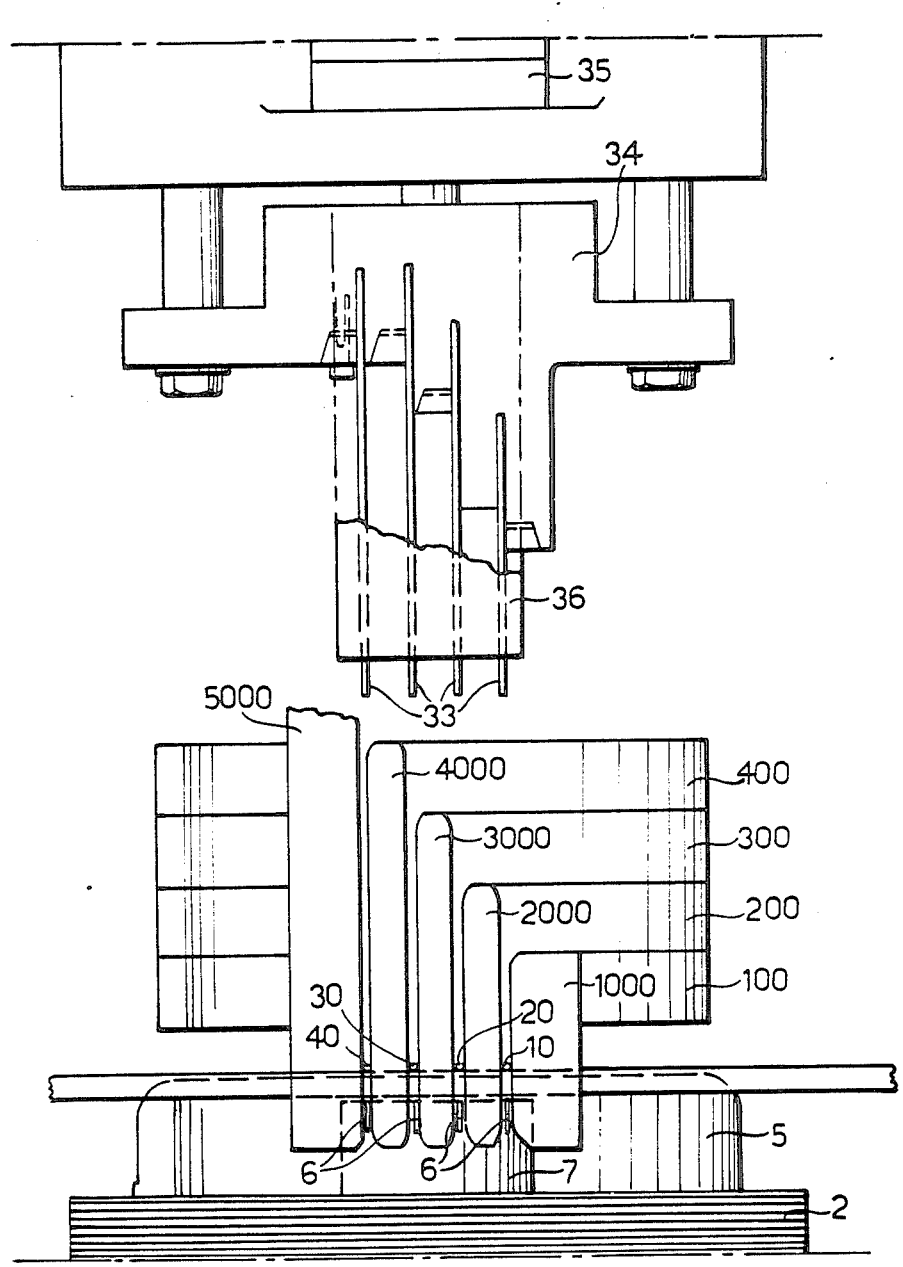

Further characteristics and advantages of the present invention will become apparent from the description which follows with reference to the appended drawings, provided purely by way of non-limiting example, in which:

FIGS. 1 to 3 are perspective views of the various operations which can be carried out by the device of the invention, FIG. 4 is a partially sectioned perspective view of a preferred embodiment of the device of the invention, FIG. 5 is a section taken on the line V—V of FIG. 4, FIGS. 6 and 7 are schematic plan views of the device of the invention in two different operating conditions, and FIG. 8 is a schematic view taken on the arrow VIII—VIII of FIG. 4.

FIGS. 1 and 3 illustrate a stator 1 of a dynamo-electric machine, having a body 2 with a central aperture 3 whose wall has axial grooves 4 in which the windings 5 of the stator coil are inserted. In the embodiment illustrated, the windings 5 have four end portions 10, 20, 30, 40 which are to be fitted into grooves 6 in a support member 7 of plastics material fixed to an end surface 2a of the stator.

The device according to the invention is used in the manufacture of the stator to fix the end portions 10-40 in the grooves 6 of the support member 7. This support member is provided in the stator in order to facilitate the subsequent connection, during manufacture, of the end portions 10-40 to electircal conductors to which they are to be attached.

The stator which is to be subjected to this operation is illustrated in the initial condition in broken outline in FIG. 1. In this condition the end portions 10-40 project upwardly from the stator in random directions.

First of all, the device includes means for disposing the end portions 10,40 along parallel directions lying in plane perpendicular to the axis of the stator and facing the end surface 2a, as illustrated in full outline in FIG. 1. In this condition the end portions 10-40 project laterally outwardly of the stator 2.

In the embodiment illustrated in the drawings, these means are constituted by a rotary brush 9 having its axis 9a perpendicular to the axis 8 of the stator and driven in a direction 11 perpendicular to both the axes 8,9a. In FIG. 1, the initial position and the final position of the rotary brush are indicated in broken outline and continuous outline respectively. The engagement of the brush 9 with the end portions 10-40 causes the latter to be forced down into the plane perpendicular to the axis 8. At the same time, the bristles of the brush expose the end portions 10-40 parallel to each other.

The device which will be described below is used for moving the end portions 10-40 from the position illustrated in continuous outline in FIG. 1 to the position illustrated in FIG. 2, where they are grouped above the support member 7, and for inserting the end portions 10-40 so disposed into the grooves 6 of the support member 7 until they reach the condition illustrated in FIG. 3.

The device includes a support structure 12 which can be moved in a vertical direction 13 (FIG. 4) so as to enable it to be brought above the structure of the stator 2. The structure 12 supports, by means of rolling bearings 14, a vertical shaft 15 incorporating a sprocket 16 which meshes with a rack 17 driven by an actuator cylinder 18. A plate 100 (see FIG. 5) is fixed to the lower end of the shaft 15 and carries an engagement member 1000 for engaging the end portion 10 so as to shift it from the position illustrated in FIG. 1 to the position illustrated in FIG. 2. Above the plate 100 are plates 200, 300, 400 which are freely rotatably mounted on the shaft 15. The plates 200, 300, 400 support respective engagement members 2000, 3000, 4000 for engaging the end portions 20, 30, 40 and shifting them from the position illustrated in FIG. 1 to the position illustrated in FIG. 2.

Each of the engagement members 1000-4000 is movable between a first position in which it is able to engage the corresponding end portion from one side when the latter is in the condition illustrated in FIG. 1, and a second position in which the engagement members 1000–4000 are grouped together adjacent the support member 7 and keep the respective end portions 10–40 above the corresponding grooves 6 in the support member. Each of the engagement members has a forked structure comprising a radially outer arm 19 and a radially inner arm 21 arranged to be disposed on the two sides of the support member 7 when the engagement members are in the second position (see FIG. 5).

Since the engagement member 1000 is fixed to the plate 100, the movement of this engagement member is effected directly by the shaft 15. The movement of the remaining engagement members 2000, 3000, 4000, however, is achieved through a system of pins and slots which connect the plates 100–400 together.

More particularly, as illustrated schematically in FIG. 6, the plate 100 has a slot 100' in which two pins 200a and 200b carried by the plate 200 are engaged. The plate 200 has an annular slot 200' in which two pins 300a and 300b carried by the plate 300 are engaged. The plate 300 has annular slot 300' in which two pins 400a, 400b carried by the plate 400 are engaged. FIGS. 6 and 7 illustrate respectively the positions of the slots 100', 200' and 300' and the pins 200a, 200b, 300a, 300b and 400a, 400b in the initial position and in the final position of movement of the engagement members 1000–4000. With reference to these drawings, when the plate 100 is rotated from the position illustrated in FIG. 6, the annular slot 100' rotates till its end meets the pin 200a. The further rotation of the slot 100 results in the rotation of the plate 200 and both the pins 200a, 200b to the position illustrated in FIG. 7. The rotation of the plate 200 in its turn causes one end of the slot 200' to engage the pin 300a and then the simultaneous rotation of the pins 300a, 300b with the plate 300. The rotation of the plate 300 consequently causes the plate 400 to rotate as a result of the engagement of the slot 300' with the pin 400a. By virtue of the arrangement described above, each of the engagement members 1000–4000 moves from the position illustrated in FIG. 6 to the position of FIG. 7, through the corresponding angular traverse. In the final position of FIG. 7, the engagement member 4000 is disposed adjacent a fixed member 5000. When the shaft 15 is driven to return the plate 100, and consequently the engagement member 1000, to the position of FIG. 6 from the position of FIG. 7, the various engagement members travel the same paths as described above but in reverse, as a result of the engagement of each of the slots 300', 200' and 100' with the respective pins 400b, 300b and 200b.

As is clear from FIGS. 6 and 7, the movement of the engagement members 1000–4000 from the position of FIG. 6 to the position of FIG. 7 not only causes the end portions 10–40 to move into the zone of the support member 7 but also deforms the end portions so as to dispose them in substantially radial directions above the grooved 6 of the support member 7.

In order to avoid the end portions being bent downwardly in a plane inclined to the plane perpendicular to the axis of the stator, the device has a plate 31 which is disposed in a plane perpendicular to the axis of the stator and intermediate the plane of the end portions 10–40 and the end surface 2a of the stator (see FIGS. 4 and 5). This plate 31 also has an arcuate slot 31a which serves as a guide for the arms 19 of the engagement members.

As shown in FIG. 8, when the engagement members are in their final positions in which they hold the end portions 10–40 above the grooves 6 of the support member, the members define guide passages 32 between them and the fixed member 5000, within which blades 33 are lowered onto the end portions 10–40 to insert them into the grooves 6 of the support member 7. The blades 33 are carried by a vertically movable device 34 controlled by an actuator cylinder 35. The blades 33 have an associated vertical plate 36 arranged above the end portions 10–40 and outside the engagement members 1000–4000 when the latter are in their final positions, to avoid any upward deflection of the end portions.

Naturally, the principle of the invention remaining the same, the constructional details and forms of embodiment may be varied widely with respect to those described and illustrated purely by way of example, without thereby departing from the scope of the present invention.

I claim:

1. A device usable in the manufacture of stators for dynamo-electric machines for fixing end portions of the stator coils to a support member carried by the stator, wherein the device includes:
   means for disposing the end portions of the stator coils in directions parallel to a plane substantially perpendicular to the axis of the stator and facing an end surface of the stator so as to make the end portions project outwardly from the stator,
   means for moving the end portions in the said plane substantially perpendicular to the axis of the stator until they are brought into a zone of the end surface of the stator in which the support member is disposed, and
   means for thrusting the end portions into corresponding grooves provided in the support member.

2. A device as defined in claim 1, wherein the means for disposing the end portions in a plane perpendicular to the axis of the stator comprise a rotary cylindrical brush having its axis perpendicular to the axis of the stator and driven so as to move in a direction perpendicular to both the axis of the brush and the axis of the stator.

3. A device as defined in claim 1, wherein the means for moving the end portions so as to bring them into correspondence with the support member comprise a series of engagement members movable in a circumferential direction outside the stator between a first position in which each of them is located next to and on one side of a respective end portion, and a second position in which they are located close together in correspondence with the support member, whereby the engagement members are arranged to thrust and group the end portions above the support member as a result of their movement from the first to the second positions.

4. A device as defined in claim 3, wherein the means for thrusting the end portions into the grooves of the support member comprise a series of movable blades guided between the engagement members when the latter are in their second positions.

5. A device as defined in claim 4, wherein each engagement member has a forked body with a radially outer arm and a radially inner arm arranged to engage the two sides of the support member.

6. A device as defined in claim 5, wherein it includes plates rotatable about the axis of the stator and carrying respective engagement members.

7. A device as defined in claim 6, wherein means are provided for rotating a first of said plates and wherein the plates are connected together by a system of slots and pins so that the movement of the first plate also causes the movement of the remaining plates.

8. A device as defined in claim 7, wherein it includes a rotary shaft to which said first plate is fixed, an actuator cylinder, and a rack and sprocket system through which the actuator cylinder drives the shaft, and wherein said remaining plates are disposed in superposed positions and freely rotatable on said shaft.

9. A device as defined in claim 5, wherein the device further includes an auxiliary plate having an arcuate guide slot for the radially outer arms of the engagement members.

* * * * *